Patented Dec. 1, 1936

2,062,349

UNITED STATES PATENT OFFICE 2,062,349

PROCESS OF MAKING ARYLAMINES

William S. Calcott and Louis S. Bake, Penns Grove, N. J., assignors to E. I. du Pont de Nemours & Company, Wilmington, Del., a corporation of Delaware No Drawing. Application September 21, 1932, Serial No. 634,197

3 Claims. (Cl. 260—130.5)

This invention relates to an improvement in the process of making arylamines involving the reaction of aqueous ammonia with halogenated aromatic hydrocarbons. More particularly, it relates to the step of carrying out the reaction in the presence of a copper compound catalyst under such conditions that the amount of catalyst present throughout the reaction is greater than a certain minimum quantity.

German Patent #204,951 of 1908 discloses a process for the production of aniline by heating chlorbenzene with aqueous ammonia under pressure in the presence of copper compounds. In 1920 Quick reported the results of experimental work on the formation of aniline by heating chlorbenzene with aqueous ammonia in the presence of cuprous salts, emphasizing the fact that it was necessary that cuprous salts be used rather than cupric.

We have found that it is of no great moment whether cuprous or cupric salts are employed provided the copper compound employed is somewhat soluble in aqueous ammonia. We may even employ cuprous oxide with very good results. We have further discovered that it is essential, in order to obtain the superior results contemplated by this invention, that a compound of copper be present throughout the course of the reaction in quantity not substantially less than 0.05 mole per mole of aromatic halogen compound. In its broadest aspects, therefore, our invention contemplates the presence of at least substantially 0.05 mole of a copper compound per mole of aromatic halogen compound, throughout the course of the reaction.

We may carry out our invention in various ways, a few of which will be shown in the following examples:

*Example 1.*—One mole of chloro-benzene was heated in an autoclave (lined with a stainless steel containing 18% chromium and 8% nickel), with 5½ moles aqueous ammonia and 0.2 mole cupric sulfate. The heating was continued for 4½ hours at 230° C. after which the charge was removed from the autoclave and the aniline isolated.

*Example 2.*—An autoclave (made of steel and lined to above the liquor level with silver), was charged with chlorbenzene, aqueous ammonia and 0.05 mole of cupric oxide (based on the chlorbenzene present). The autoclave contents were heated to 200° C. for 8 hours, after which they were discharged and worked up as usual.

If desired metallic copper may be present during the reaction although our process can be operated equally well whether metallic copper is present or absent. The essential thing is that a minimum amount of a copper compound be present in solution. We have obtained good yields with as little as 0.1 mole of cuprous chloride. If the amount of cuprous chloride (or other copper salt) is materially less than this, either because the amount used in the first place was less or because the copper salt has been destroyed the yield is markedly reduced. With the small amount of copper compound used, that is from 0.05–0.03 mole, it can readily be seen that, if the charge is in contact with a metal like iron, sufficient metallic copper may be precipitated from the solution of the cuprous or cupric salt to reduce the amount of catalyst present to an amount so low as to be insufficient for the purposes contemplated by the invention. Inter alia a slow reaction and a low yield of aromatic amine result from such an insufficiency. Using cuprous oxide, we have obtained good results with as little as about 0.05 mole. Other copper salts which are soluble in aqueous ammonia solutions to the desired extent may also be employed.

The autoclaves may have an inner surface of other materials than those of the specific examples which are inert to ammoniacal copper solutions and which will not destroy the catalyst by precipitating copper from such solutions. Among such other materials which may be employed for lining the autoclaves are chromium, nickel and stainless steels of the type mentioned in Example 1. This type of stainless steel usually comprises a steel alloy containing enough chromium and nickel to render the steel austenitic and non-magnetic. Such alloys contain approximately twice as much chromium as nickel or vice versa. Accordingly, when the term "stainless steel" is employed in this application and claims, it is intended to indicate a steel alloy of this type. The stainless steel of Example 1 has proved to be the most satisfactory and constitutes the preferred embodiment of our invention.

Our process is applicable to halogenated aromatic compounds other than chlorbenzene.

though it is possibly best adapted to chlorinated benzenes. We have found it of particular value in the production of aniline from chlorbenzene. As examples of other chlorinated aromatic hydrocarbons which may be treated in accordance with our invention, the following list is given indicating products obtained therefrom.

| Compounds treated | Product |
|---|---|
| Dichloro-benzenes | Phenylene-diamines. |
| p-Di-chloro-benzene | p-Phenylene-diamine. |
| Chloro-phenols | Amino-phenols. |
| p-Chloro-phenol | p-Amino-phenol. |
| Chloro-toluene | Toluidine. |
| Chloro-naphthalenes | Naphthylamines. |
| Chloro-xylenes | Xylidines. |
| Chloro-phenol ethers | Amino-phenol ethers. |
| Chloro-anisoles | Anisidines. |
| Chloro-phenetols | Phenetidines. |
| Chloro-cresol ethers | Cresidines. |
| Chloro-diphenyl ethers | Amino-diphenyl ethers. |
| Chloro-naphthols | Amino-naphthols. |
| Chloro-naphthol ethers | Amino-naphthol ethers. |
| Ring-alkylated-chloro-naphthalenes | Ring-alkylated-naphthylamines. |
| Other carbocyclic ring systems as— | |
| Halogenated-diphenyls and derivatives | Amino-diphenyls and derivatives. |
| Halogenated-anthracenes | Amino-anthracenes. |
| Halogenated phenanthrenes | Amino-phenanthrenes. |
| Heterocyclic ring systems as— | |
| Halogenated-carbazoles | Amino-carbazoles. |
| Halogenated-diphenylene-oxides | Amino-diphenylene-oxides. |
| Halogenated-thiazoles | Amino-thiazoles. |

In place of chlorinated compounds, brominated compounds or other halogenated compounds may be treated.

While we have disclosed a process for treating certain specific substances under specific conditions, it will be readily apparent to those skilled in the art that other similar compounds may be treated and the conditions of the treatment widely varied without departing from the spirit of our invention. Accordingly, the scope of our invention is to be limited solely by the appended claims construed as broadly as is permissible in view of the prior art.

We claim:

1. In the process of preparing an amino-benzene which comprises reacting chlor-benzene with aqueous ammonia in the presence of a catalyst, the step which comprises carrying out the reaction in a vessel lined with stainless steel, in the presence of at least 0.05 mole of a copper compound soluble in aqueous ammonia per mole of the chlor-benzene.

2. The process of preparing aniline which comprises heating about one mole of mono-chloro-benzene with about 5.5 moles of aqueous ammonia and about 0.2 mole of cupric sulfate for about 4.5 hours at about 230° C. in an autoclave lined with a stainless steel containing about 18% of chromium and about 8% of nickel, then removing the charge from the autoclave and isolating the aniline.

3. In a process of preparing an aromatic amine involving the reaction of an aromatic halogen compound with aqueous ammonia in the presence of a catalyst, the steps which include carrying out the reaction in the presence of a catalyst comprising essentially at least 0.05 mole of a copper compound soluble in aqueous ammonia per mole of the aromatic halogen compound in a vessel in which the parts in contact with the reaction mixture are constructed of stainless steel.

WILLIAM S. CALCOTT.
LOUIS S. BAKE.